United States Patent [19]

Gardner

[11] 4,291,280

[45] Sep. 22, 1981

[54] AC GENERATOR SYSTEM HAVING STABILIZED SENSITIVITY FOR SENSING THE PRESENCE OR ABSENCE OF A CONDUCTIVE OBJECT

[75] Inventor: George A. Gardner, Rochester, N.Y.

[73] Assignee: Sybron Corporation, Rochester, N.Y.

[21] Appl. No.: 960,918

[22] Filed: Nov. 15, 1978

[51] Int. Cl.³ .................... G01R 33/00; G01V 3/11
[52] U.S. Cl. ................................. 331/65; 324/222;
324/327; 361/180
[58] Field of Search ................. 331/65, 109, 183;
328/5; 361/180, 203; 324/222, 327

[56] References Cited

U.S. PATENT DOCUMENTS

| | | | |
|---|---|---|---|
| 2,919,413 | 12/1959 | Charles | 331/65 |
| 3,005,110 | 10/1961 | Elam | 307/41 |
| 3,127,105 | 3/1964 | Nichols | 236/78 |
| 3,129,415 | 4/1964 | McKnight | 340/258 |
| 3,331,016 | 7/1967 | Eksten | 323/66 |
| 3,453,532 | 7/1969 | Gardiner | 331/65 X |

OTHER PUBLICATIONS

Behar, "The Handbook of Measurement and Control", The Instruments Publishing Company, Inc., Pittsburgh, Pa., 1951, p. 125.
"The Instrument Manual", United Trade Press, Ltd., London, 1953, p.410.
"400 Ideas for Design," Hayden Book Company, Inc., NY, 1971, pp. 119, 120, 254, 255.
Science and Electronics, Oct.-Nov., 1969, pp. 79-82.

*Primary Examiner*—Siegfried H. Grimm
*Attorney, Agent, or Firm*—Theodore B. Roessel; Joseph C. MacKenzie

[57] ABSTRACT

A conductive object detector having an eddy current killed oscillator, wherein the oscillator output is stabilized by means of a proportional plus integral controller. The controller proportional gain is set low and the integral time long, hence a conductive object near the oscillator will "kill" it, whereas the controller will minimize the effect of temperature or aging on the oscillator output.

2 Claims, 3 Drawing Figures

AC GENERATOR SYSTEM HAVING STABILIZED SENSITIVITY FOR SENSING THE PRESENCE OR ABSENCE OF A CONDUCTIVE OBJECT

BACKGROUND OF THE INVENTION

It has been heretofore proposed to detect the presence or absence of an electrically-conductive object in a given zone.

Thus, the so-called "eddy current killed oscillator" systems of Micro Switch of Freeport, Ill., a division of Honeywell, Incorporated, have been so used. In particular, I have found that such system, including Micro Switch's FMA2 "All Metals" (Extended Sensitivity) Amplifier, and Micro Switch's FMSAL 5-6 sensor loop is well suited, all things being equal, to detecting a strip of thin aluminum foil, an inch or so wide and about the diameter of the loop, when such strip is within about 2 inches of the loop for as short a time as 0.04 seconds.

The FMA2 is, in effect, a generator of 500 KHz alternating current which is coupled by the sensor loop into the zone in which detection is to occur. Detection may be considered to occur due to the change in loading of the generator, such change being due to sufficient eddy current induction in a foil strip, when the strip gets close enough to the loop, at least momentarily. However, the sensitivity of the system is critical, in that if it is set too low it will not detect the presence of a strip, whereas if it is too high, the generator "locks up", responding by turning off (as is intended) in response to the presence of a strip, but, when that strip departs from the detection zone remains off, (which is not intended). Again, at maximum sensitivity, inductor temperature increase alone may cause the generator to cease oscillating. While it is possible to adjust the sensitivity of detection to an intermediate value wherein the generation of 500 KHz only ceases while the foil strip is in the detection zone, the adjustment is unstable. Thus, changes in the temperature of the loop (and probably drift in circuit component values) throws the adjustment off.

SUMMARY OF THE INVENTION

The object of my invention is to stabilize the aforesaid sensitivity. Briefly, I have discovered that the sensitivity adjustment will remain stable if the alternating current in the loop can be regulated to a predetermined magnitude, without preventing the system from detecting the foil strip. While such detection results in a change in loop impedance, and therefore changes the value of loop current, my invention makes the regulation sufficiently insensitive to rapid loop current changes, that it in effect responds only to environmental temperature change, component aging, and/or other effects which, in contrast to the effect of the strip, occur at slow rates over long periods of time. In particular, I measure the value of AC voltage across the loop, compare it to a desired value thereof which should provide optimum sensitivity adjustment, and if there is a difference between the values, adjust loop current such as to diminish said difference. To do this I use a "proportional plus integral" controller as a regulator of loop current, wherein the proportional gain is set so low that the change in current due to proportional effect is small with respect to the magnitude of such loop current change as would be caused by the presence of a foil strip in the detection zone. As for the integral time, this would be set relatively long, as compared to the integral time as would be appropriate for regulating a loop current change of relatively-large magnitude, and short-duration, as compared to loop current changes caused by temperature or aging of circuit elements.

DESCRIPTION OF THE PREFERRED EMBODIMENT

Figure 1:
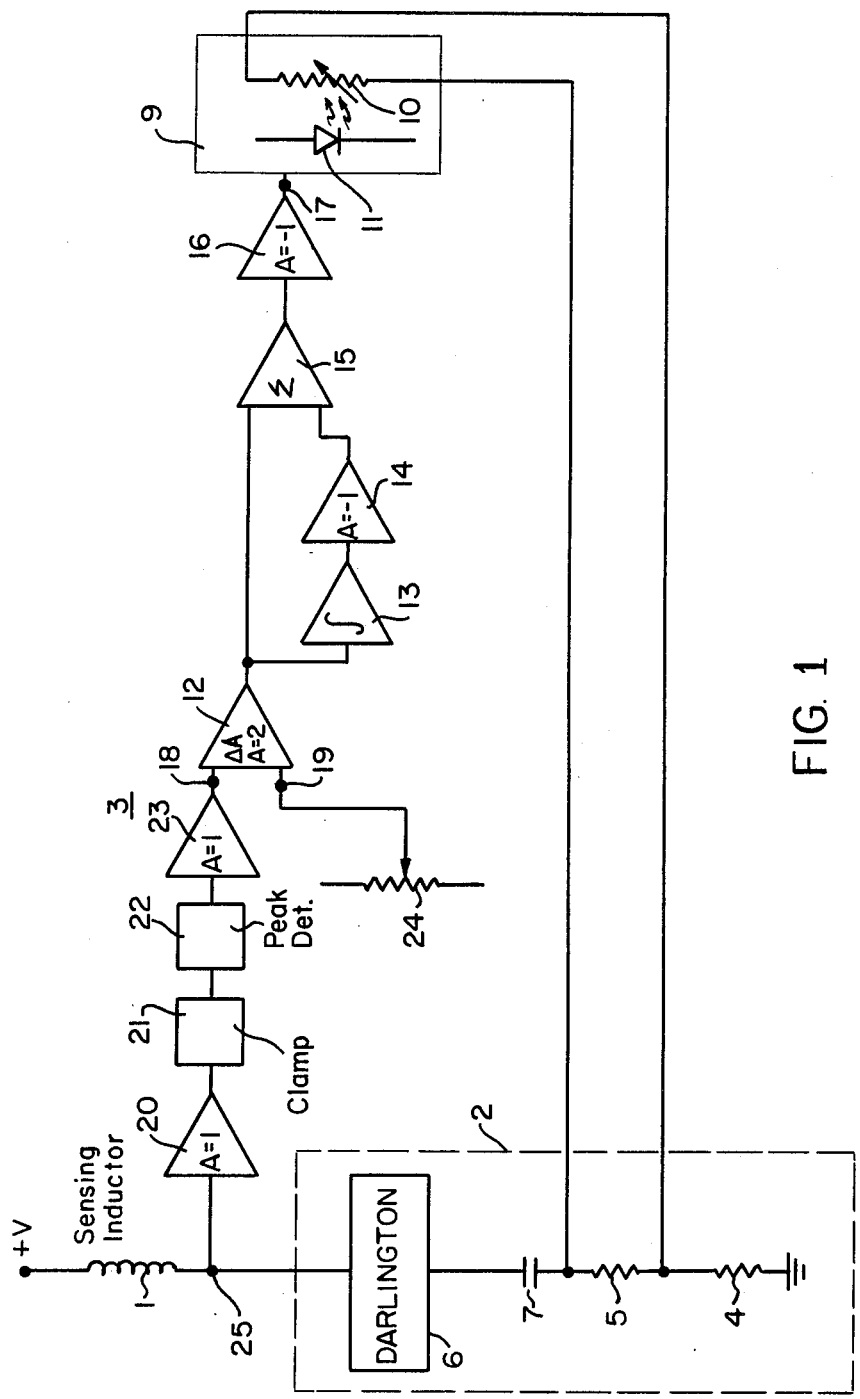
FIG. 1 is a box diagram illustrating a system according to my invention.

In FIG. 1, the sensor loop FMSAL 5-6 is represented by an inductance 1. The generator 2 FMA-2 is represented by a dashed-outline box and later-to-be described circuitry in said box, the remainder of the Figure is a box diagram representating my stabilizer 3.

The actual circuitry of generator 2 is represented by the loop thereof normally containing the loop inductance 1, which is actually a circular coil 6 inches or so in diameter, variable resistor 4, resistor 5, Darlington circuit 6, and capacitor 7 are found in the commercial form of the FMA-2 exactly as shown, with the sole exception that I have replaced resistor 5 with one larger in value (several hundred ohms versus 100 ohms).

Variable resistor 4 is the sensitivity adjustment for the commercial form of FMA-2. In order to stabilize its setting, once chosen for optimum detection sensitivity, I provide photocoupler 9 having variable resistor 10 connected in parallel with resistor 5. Resistor 10 is light-sensitive, varying from about 500 ohms up, in inverse proportion to the intensity of light directed on it. In this case, photocoupler 9 has a LED 11 therein for illuminating resistor 10, at an intensity proportional to current through the LED. Such current is provided by a proportional plus integral controller represented by difference amplifier 12, integrator 13, inverter 14, summing amplifier 15, and inverting amplifier 16. As those skilled in the art know, this conventional configuration has the property of producing at output terminal 17 a DC current proportional to the sense, magnitude, and duration of deviation, if any, of the voltage at terminal 18 from the voltage at terminal 19.

The DC voltage at terminal 18 is in effect the clamped, rectified AC voltage across inductance 1, there being shown a typical instrumentation arrangement of buffer amplifier 20, clamp 21, peak detector 22, and buffer amplifier 23, for producing the last said voltage from the AC voltage at the connection 25 between inductance 1 and Darlington circuit 6.

The voltage at terminal 19 is a DC voltage similar to the voltage at terminal 18, except that it is obtained from a DC voltage source 24 which can be set by a screw, knob, or the like, to some voltage the value of which corresponds to the inductance current value at which it is or may be desired to regulate inductor current for obtaining stable sensitivity.

At this point, the mode of operation of the system of FIG. 1 should be more or less obvious. In any event it is easy to see that if we set source 24 at some desired value and if this produces a voltage at terminal 19 which is, say, larger than the voltage at terminal 18, then the current through LED 11 is going to increase, which will decrease the resistance of resistor 10 so that more alternating current flows in the inductance 1. Now, because a similar non-zero voltage deviation can be obtained at terminals 18 and 19 by a conducting body coming into the AC field of inductance 1 at a time when the deviation was zero, the proportional plus integral controller will try to get the deviation back to zero. However, in the latter case, this is neither necessary nor desirable, since the intended effect of the conductive body is to change, in effect, the Q of the inductance enough for the generator to turn off, and to stay off until the object leaves the detection zone.

On the other hand, if, say, the temperature of the inductance begins to change from that which it had when resistor 4 was set, it will usually change slowly and in any event will not have as large an effect on the current through the inductance, as does the presence of the conductive object in the field of the inductance. Therefore, I set the proportional and integral adjusting elements (not shown) of the controller at values suitable to compensating the effect of temperature. As those skilled in the temperature control arts will recognize, this is the common situation whenever the thing controlled needs to be controlled very modestly over a relatively long period of time, which is the antithesis of what the situation would be if it were attempted to regulate the current change due to presence of the conductive object.

Figure 2A:
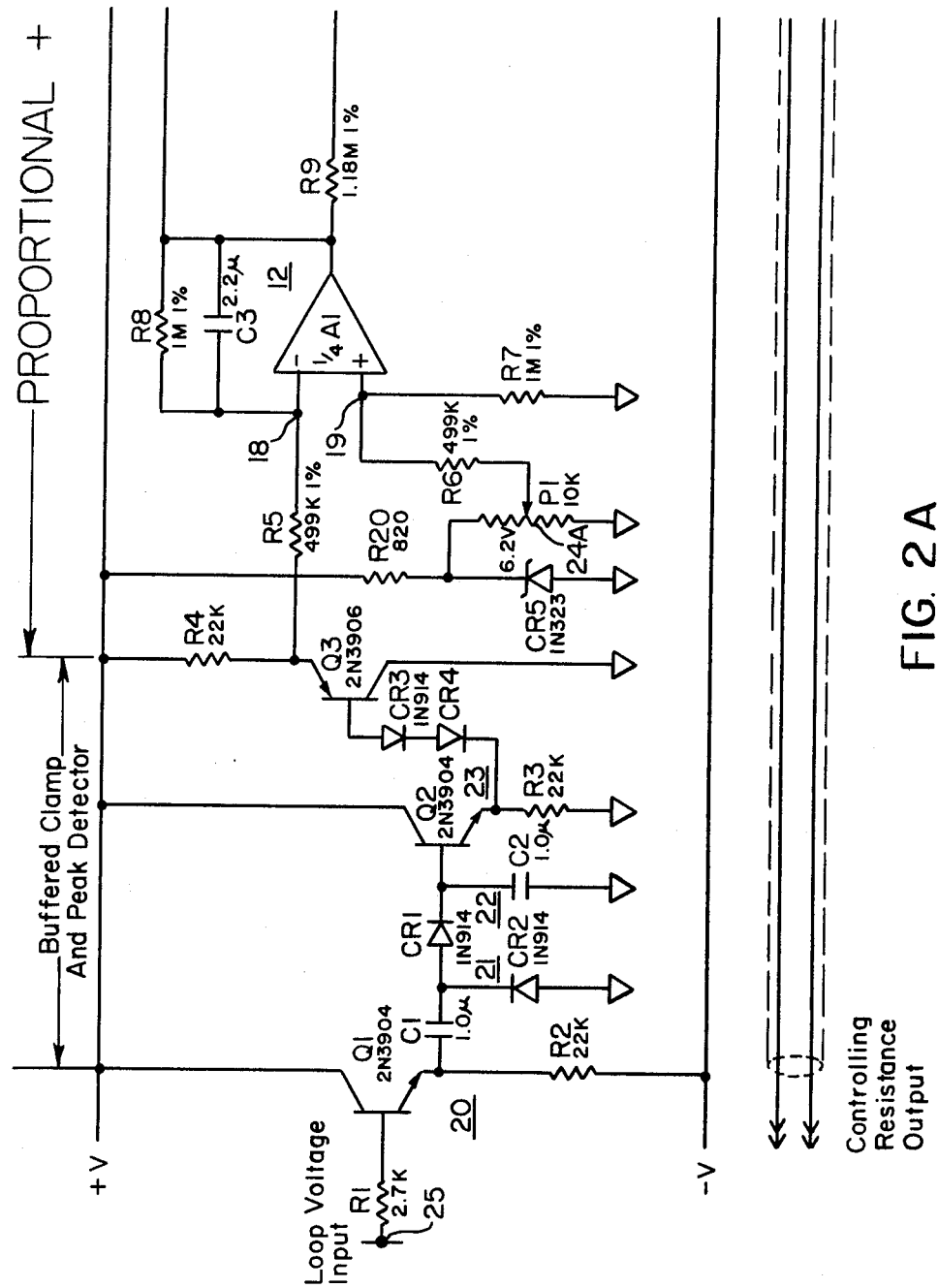
FIGS. 2A and 2B are detailed diagrams showing a sensitivity stabilizing circuit according to my invention.
Figure 2B:
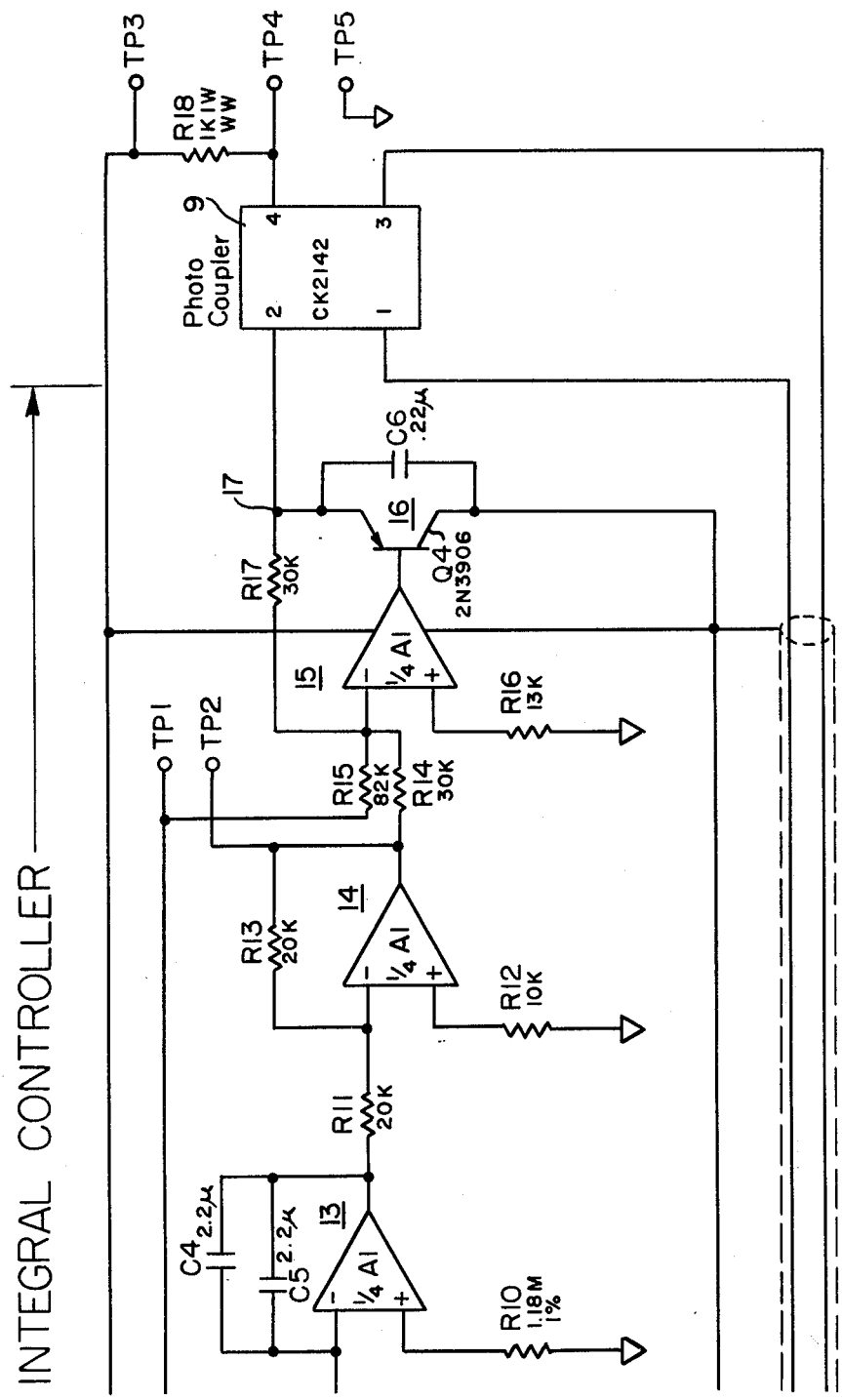

In FIGS. 2A and 2B, I show a particular circuit, including parts values, which I prefer for use as stabilizer 3 of FIG. 1. The proportional plus integral controller takes the form of the four similar amplifiers (marked "A1") of a National Semiconductor Corp. LM 224 chip, the photocoupler being a CK2142 chip manufactured by Raytheon, Inc. It is practical to set the proportional and integral effect once and for all for the particular Micro Switch system used (as described supra). Such settings are due to the 30 K and 82 K resistors shown connected to the negative input terminal of the rightmost "A1" amplifier.

In FIG. 2A, the 1N914 silicon diodes and the 1.0 mf capacitors between Q1 and Q2 provide clamped peak detection. However, the diodes and transistors are temperature dependent, so for temperature compensation, I provide the two series 1N914 silicon diodes between transistor Q2 and transistor Q3 as well as said transistor Q3.

The plus terminal of the leftmost "A1" amplifier is shown connected to the slider of a 10K variable resistor 24A. This adjustment is for establishment of the voltage level at which inductor current is to be regulated, in other words, resistor 24A corresponds to source 24 of FIG. 1.

The intended particular application of my invention is the detection of seams in a continuous moving web of textile undergoing treatment, say being dyed. The continuity of the web is due to the fact that the web is formed from discrete lengths of textile sewn together end to end, leaving seams which, for various well-known reasons, one frequently desires to detect as they pass one point or another in the course of treating the web. For detection using my invention, each seam to be detected is provided with a piece of aluminum foil about 1 inch by 6 inches. The foil is preferably sewn into the seams as part of the process of creating the continuous web by sewing the discrete lengths of textile together. The foil is positioned at one side of the web, with its length substantially coincident with the length of the seam, and the sensor loop corresponding to inductance 1 is located at the same side of the web and has its plane parallel to the surface of the web, preferably about 1 inch therefrom, if using the particular system disclosed herein, at whatever point in the course of processing, at which seam detection is necessary or desirable.

I claim:

1. A conductive object sensing system comprising, in combination, an oscillator for generating an alternating current and having inductance means responsive to a conductive object proximate thereto for causing said oscillator to stop generating said current;

regulator means connected to said oscillator for sensing said current and for producing a control signal in response thereto and in its value being in correspondence with both magnitude of deviation of said current from a predetermined level and duration of said deviation;

said predetermined level being that corresponding to there being no conductive object proximate to said sensor;

said oscillator having variable impedance through which said current flows, and which is connected to said regulator means for being varied by said control signal for changing the level of said current in accordance with the value of said control signal.

2. The system of claim 1, wherein said regulator means is a proportional plus integral controller having its proportional and integral effects set such as to be relatively insensitive to relatively brief deviations of said current, for producing said control signal with a value corresponding mainly to duration of such deviations.

* * * * *